United States Patent [19]
Seki et al.

[11] Patent Number: 5,311,297
[45] Date of Patent: May 10, 1994

[54] HDTV TO CONVENTIONAL TV SIGNAL CONVERTING APPARATUS WITH NON-LINEAR LEVEL CORRECTION

[75] Inventors: Yoshio Seki, Osaka; Atsushi Ishizu, Takatsuki; Masaki Tokoi, Neyagawa, all of Japan

[73] Assignee: Matsushita Electric Industrial Co., Ltd., Osaka, Japan

[21] Appl. No.: 709,234

[22] Filed: Jun. 3, 1991

[30] Foreign Application Priority Data

Jun. 7, 1990 [JP] Japan ................................. 2-148994

[51] Int. Cl.⁵ .............................................. H04N 9/69
[52] U.S. Cl. ...................................... 348/675; 348/458; 348/624
[58] Field of Search ................... 358/11, 32, 141, 164, 358/174, 140, 36; H04N 9/69

[56] References Cited

U.S. PATENT DOCUMENTS 5,057,919 10/1991 de Haan et al. ................ 358/164 X
5,079,622 1/1992 Toshinobu ..................... 358/164 X

FOREIGN PATENT DOCUMENTS

62-172873 7/1987 Japan .
63-136790 6/1988 Japan .

Primary Examiner—Victor R. Kostak
Attorney, Agent, or Firm—Wenderoth, Lind & Ponack

[57] ABSTRACT

A television signal converting apparatus receives a high definition television signal which is processed approximately linearly on the transmission and receiving sides and whose transmission only is processed non-linearly. A non-linear level correction circuit is provided, which collectively simultaneously carries out two kinds of non-linear processes, namely, a transmission inverse gamma correction and a CRT gamma correction, which are executed on the transmission side, thus precisely reproducing the signal level of a luminance signal by using a small-scale circuit.

6 Claims, 6 Drawing Sheets

HDTV TO CONVENTIONAL TV SIGNAL CONVERTING APPARATUS WITH NON-LINEAR LEVEL CORRECTION

BACKGROUND OF THE INVENTION

1. Field of the Invention

This invention relates to a television signal converting apparatus for converting a high definition television signal into a conventional television signal and more particularly, to a television signal converting apparatus having a non-linear level correction means capable of precisely reproducing the signal level of a luminance signal of a high definition television signal which is transmitted non-linearly.

2. Description of the prior Art

A high definition television signal has a frequency band of at least 20 MHz, so that when it is transmitted by a direct broadcasting satellite or the like, it must be subjected to bandwidth compression by an appropriate method. As an effective technique to largely compress the frequency bandwidth of a high definition television signal, the MUSE (Multiple Sub-Nyquist Sampling Encoding) method has been proposed. (See, for example, Y. Ninomiya, et al; "An HDTV Broadcasting System Utilizing a Bandwidth Compression Technique - MUSE", IEEE Trans. Vol. BC-33, No. 4 p. 130 (1987).)

The MUSE technique has adopted as a transmission system the so-called quasi constant luminance transmission system. In this system, an input video signal is encoded and decoded substantially linearly based on the MUSE method and transmitted non-linearly. By performing only the transmission of a video signal non-linearly, noise effects generated in transmission lines have been reduced. The quasi constant luminance transmission system is disclosed, for example, in Japanese Laid-Open patent application No. 63-136790, entitled "Component Video Signal Transmission Method".

Figure 6:
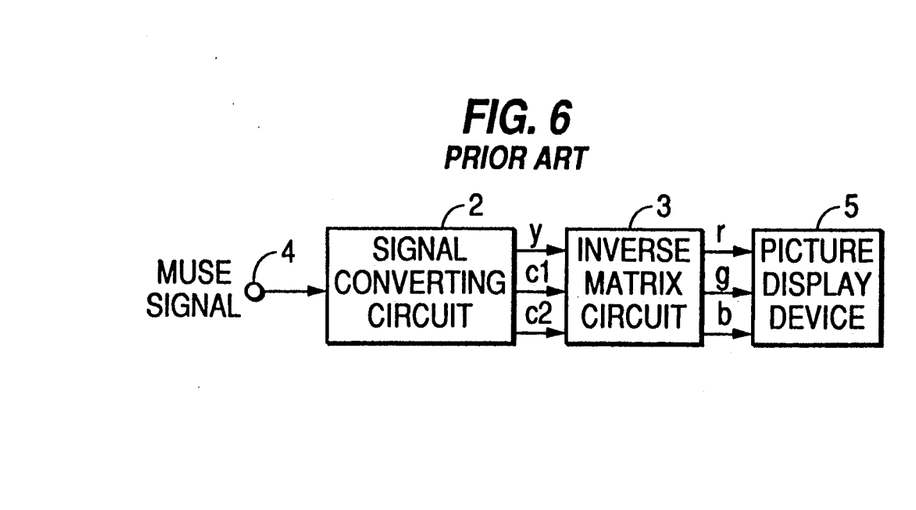
FIG. 6 is a block diagram of a television signal converting apparatus showing an example of the prior art.

To receive a bandwidth-compressed MUSE signal, an appropriate receiver (MUSE decoder) must be used. However, such a receiver is expensive, so that it is estimated that it will take a considerably long period of time to make it popular for home use. As a result, in order to enjoy accepting the high definition television broadcasting service using a commercially available conventional television receiver, there is a signal converting apparatus available, which converts a MUSE signal into a conventional television signal. As a system to be used for this purpose, a circuit structure shown in FIG. 6 can be pointed out as an example. In FIG. 6, a signal converting circuit 2 receives from a MUSE signal input terminal 4 a MUSE signal which has been transmitted non-linearly to change the number of scanning lines thereof for generating a luminance signal and chrominance signal of the conventional television system and sends them to an inverse matrix circuit 3. The inverse matrix circuit 3 converts the luminance Y signal and the chrominance signals C1 and C2 outputted from the signal converting circuit 2 into red, green and blue (rgb) signals and sends them to a picture display device 5.

If a CRT is used as the picture display device 5, due to the difference between the non-linear characteristic that the CRT possesses and the non-linear level expansion characteristic carried out for non-linear transmission on the transmission side, a linear relationship cannot be established between an input signal level of a camera on the transmission side and a display signal level on the CRT display. As a result, the level of a luminance signal cannot be precisely reproduced on the receiving side.

Figure 7:
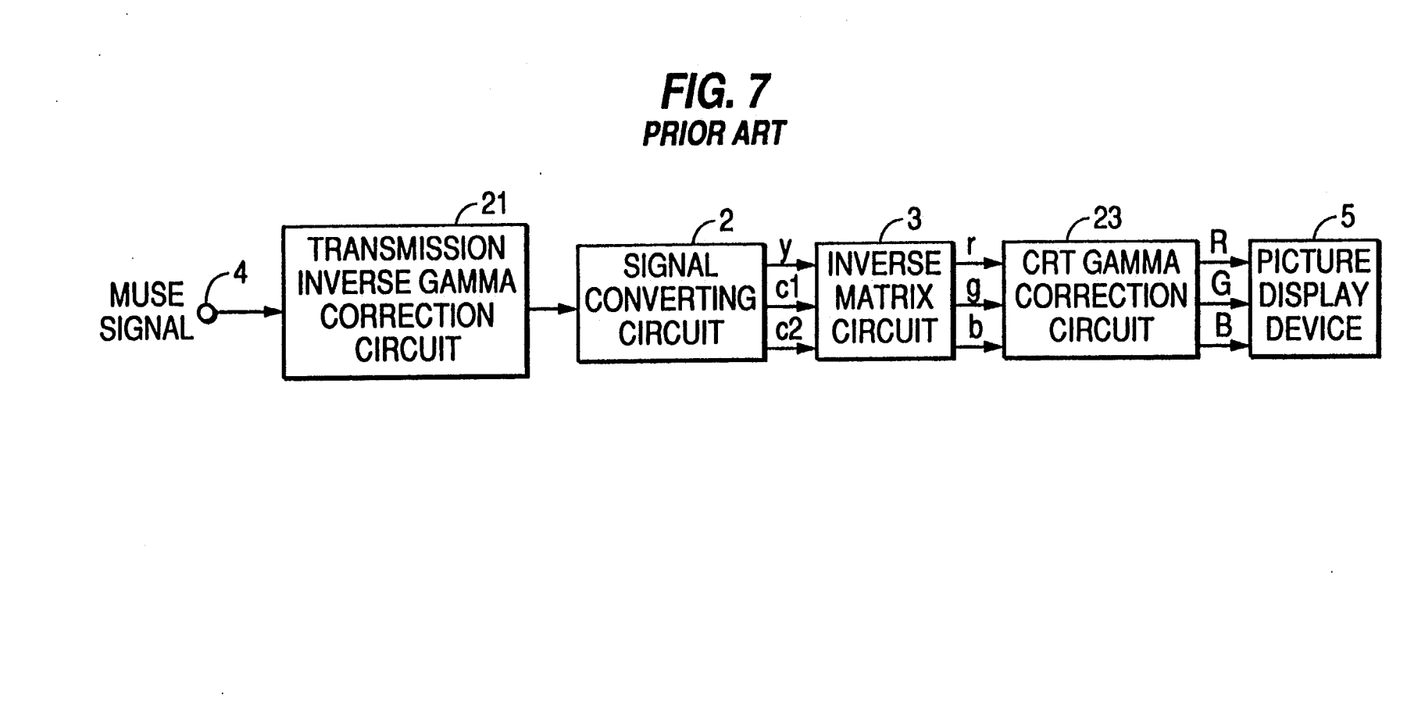
FIG. 7 is a block diagram of a television signal converting apparatus showing another example of the prior art.
Figure 8:
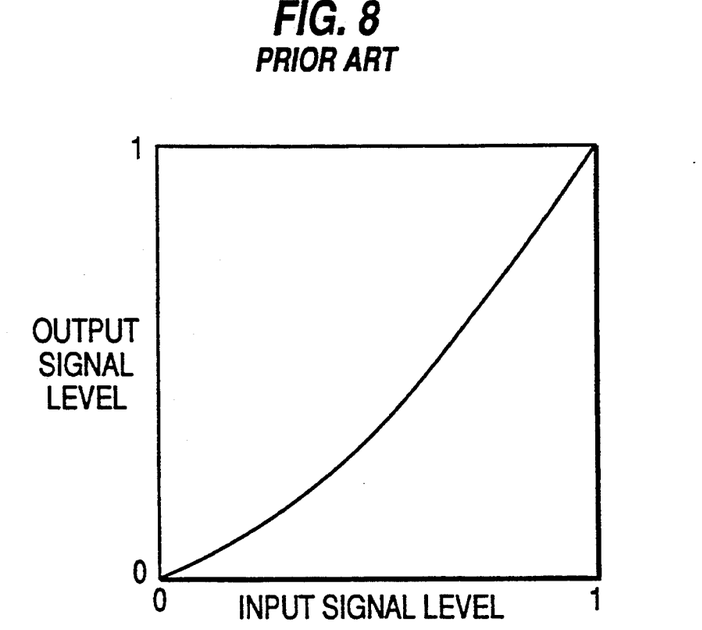
FIG. 8 shows an input-output characteristic of a transmission inverse gamma correction circuit shown in FIG. 7.
Figure 9:
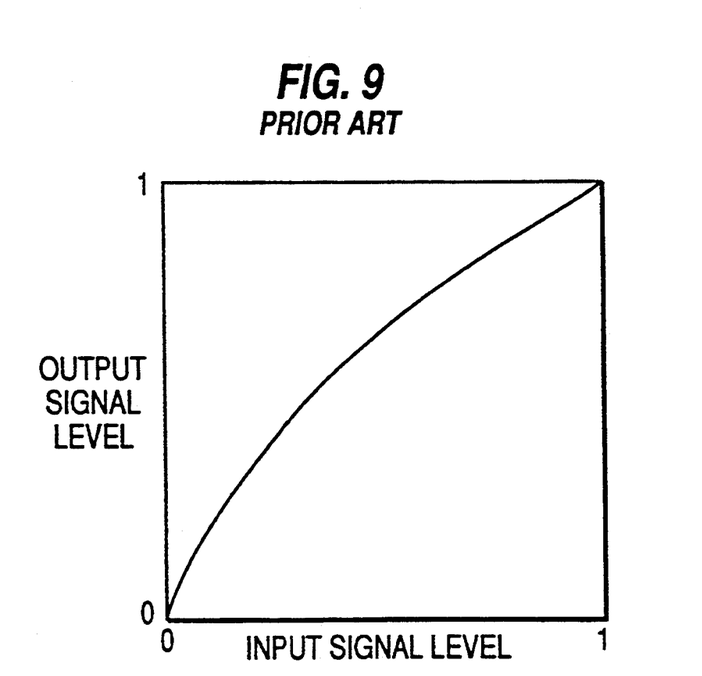
FIG. 9 shows an input-output characteristic of a CRT gamma correction circuit shown in FIG. 7.

In addition, as a signal converting apparatus for precisely reproducing the level of a luminance signal, a circuit structure as shown in FIG. 7 can be pointed out as an example. In FIG. 7, a transmission inverse gamma correction circuit 21 possesses such an input-output characteristic that the gradient of its curve is increased with an increase in the input signal level as shown in FIG. 8. Such an input-output characteristic is complementary to the non-linear level expansion characteristic to be carried out for the MUSE signal on the transmission side in order to transmit it non-linearly. By possessing the input-output characteristic as shown in FIG. 8, the transmission inverse gamma correction circuit 21 executes a transmission inverse gamma correction process for a MUSE signal supplied from a MUSE signal input terminal 4 for compressing the signal level thereof, thereby making the MUSE signal, which is transmitted under a state that the signal level is being expanded, into a linear signal. Then, the linear signal is sent to a signal converting circuit 2. The signal converting circuit 2 carries out the scanning line conversion of a video signal having 1125 scanning lines per frame sent from the transmission inverse gamma correction circuit 21 to generate a luminance signal Y and chrominance signals C1 and 2c of the conventional television system and sends them to a matrix circuit 3. The inverse matrix circuit 3 converts the chrominance signals C1 and C2 and luminance signal Y sent from the signal converting circuit 2 into rgb signals and sends them to a CRT gamma correction circuit 23. The gamma correction circuit 23 has an input-output characteristic as shown in FIG. 9. The gamma correction circuit 23 executes the CRT gamma correction process to expand the signal levels of the rgb signals outputted from the inverse matrix circuit 3 in response to the input-output characteristic as shown in FIG. 9 in order to correct for the non-linear characteristic that the CRT possesses, thereby sending the thus corrected RGB signals of the conventional television system to a picture display device 5.

The signal converting apparatus shown in FIG. 7 can reproduce precisely the signal level of a luminance signal. For this, however, it is necessary to have at least two kinds of non-linear processing circuits such as the transmission inverse gamma correction circuit 21 and the CRT gamma correction circuit 23. As a result, the circuit scale becomes large, which means that a problem arises in that the signal converting apparatus itself contributes to an increase in cost.

SUMMARY OF THE INVENTION

An object of this invention is to provide a television signal converting apparatus for receiving a high definition television broadcasting service using a conventional television receiver, which is small in scale and which precisely reproduces the signal level of at least a luminance signal thereof.

In order to attain the above-mentioned object, a television signal converting apparatus of this invention comprises: a non-linear level correction means which receives a high definition television (HDTV) signal transmitted non-linearly as an input signal thereof and corrects the signal level thereof based on a predetermined non-linear characteristic; a signal converting means for converting an output signal from the non-linear level correction means into a luminance signal and a chrominance signal of a conventional television system having a different number of scanning lines from that of the HDTV signal; a inverse matrix means for converting the luminance signal and chrominance signal of the conventional television system sent from the signal converting means into three primary color signals; and a picture display means which converts an output signal from the inverse matrix means into an optical signal and displays it thereon.

The non-linear correction means corrects a difference between a non-linear level expansion characteristic carried out for the luminance signal of the HDTV signal on a transmission side for non-linear transmission and a non-linear electro-optic conversion characteristic that the picture display means possesses.

The signal converting means carries out scanning line conversion of the HDTV signal level-corrected by the non-linear level correction means and outputs the luminance signal and chrominance signal of the conventional television system to the inverse matrix means. The inverse matrix means converts the luminance signal and chrominance signal of the conventional television system thus obtained into three primary color signals and outputs them to the picture display means.

With the structure as shown above, a television signal converting apparatus is capable of converting a HDTV signal into a conventional television signal as well as keeping a precise reproduction of the signal level of a luminance signal and is smaller in size than a conventional apparatus, meaning that its practical effects are extremely large.

DESCRIPTION OF THE PREFERRED EMBODIMENTS

Preferred embodiments will be described in detail below while referring to the drawings attached. In this case, however, elements having the same objects and functions as those shown in FIGS. 6 and 7 are indicated by the same reference numerals as those shown in FIGS. 6 and 7 and detailed descriptions thereof have been omitted.

Figure 1:
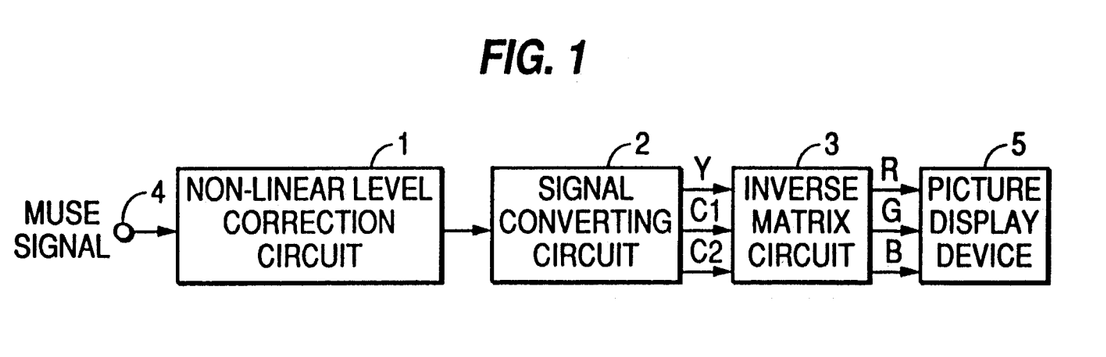
FIG. 1 is a block diagram of a television signal converting apparatus of one embodiment of this invention.

FIG. 1 is a block diagram of a television signal converting apparatus according to one embodiment of this invention.

Figure 2:
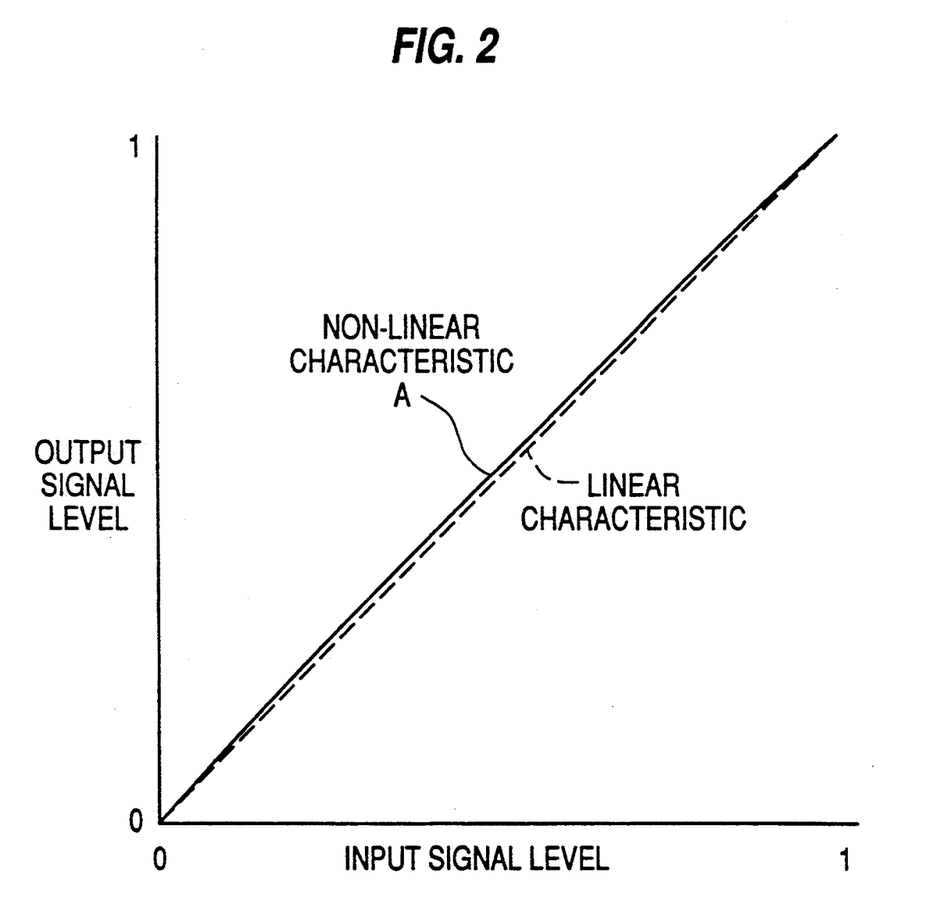
FIG. 2 shows an input-output characteristic of a non-linear level correction circuit shown in FIG. 1.
Figure 3:
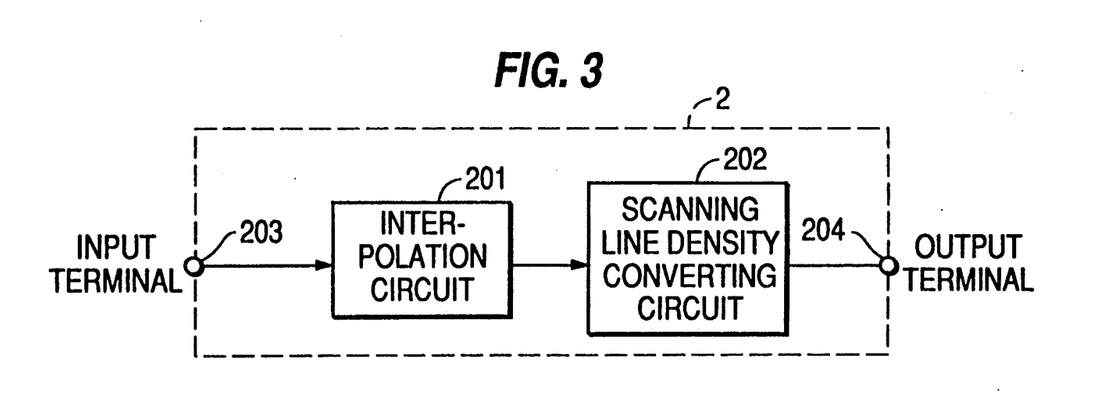
FIG. 3 is a block diagram of a signal converting circuit shown in FIG. 1.

In FIG. 1, a non-linear level correction circuit 1 possesses an input-output characteristic as shown by the continuous line in FIG. 2. Non-linear characteristic A shown by the continuous line in FIG. 2 is obtained resulting from the composition of a characteristic of the transmission inverse gamma correction, which is shown in FIG. 8, and a characteristic of the CRT gamma correction, which is shown in FIG. 9. That is, it is a characteristic for correcting the difference between the non-linear level expansion characteristic carried out on the transmission side for non-linear transmission and the non-linear characteristic that the CRT possesses. The non-linear level correction circuit 1 receives a MUSE signal from a MUSE signal input terminal 4 to perform non-linear level correction for expanding the signal level so as to correct for the difference between the non-linear level expansion characteristic and the non-linear characteristic that the CRT possesses in response to the input-output characteristic shown in FIG. 2, and outputs the signal thus obtained to a signal converting circuit 2. The signal converting circuit 2 comprises, for example, an interpolation circuit 201 and a scanning line conversion circuit 202 as shown in FIG. 3.

In the signal converting circuit 2, the interpolation circuit 201 receives a MUSE signal subjected to the non-linear level correction by the non-linear level correction circuit 1 as an input signal for interpolation and outputs the signal thus interpolated to the scanning line conversion circuit 202. In this case, the interpolation is a process to restore original picture data from a bandwidth-compressed video signal. For example, it is made in such a manner that picture data not transmitted is interpolated using the picture data transmitted on an intra-field basis.

The scanning line conversion circuit 202 converts a signal having 1125 scanning lines per frame into a signal having the number of scanning lines of the conventional television system and sends a luminance signal Y and chrominance signals C1 and C2 of the conventional television system to an inverse matrix circuit 3. The conversion of the number of scanning lines is carried out by thinning out the scanning lines by a predetermined number. The inverse matrix circuit 3 converts the luminance signal Y and chrominance signals C1 and C2 of the conventional television system sent from the signal converting circuit 2 into RGB signals and sends them to a picture display device 5. The picture display device 5 converts the RGB signals thus sent from the inverse matrix circuit 3 into optical signals. When CRT is used for the picture display device 5, since the difference between the non-linear level expansion characteristic carried out on the transmission side for non-linear transmission and the non-linear characteristic that the CRT possesses is corrected by the non-linear level correction circuit 1, there is a linear relationship between the input signal level of a camera on the transmission side and the display signal level on the CRT, which means that the level of a luminance signal can be precisely reproduced.

According to this embodiment as shown above, by providing the non-linear level correction for circuit 1 for correcting the difference between the non-linear level expansion characteristic carried out on the transmission side and the non-linear characteristic that the CRT possesses, the signal level of a luminance signal can be precisely reproduced using a small scale circuit, thus providing a television signal converting apparatus for using an HDTV broadcasting service with a conventional television receiver.

The non-linear level correction circuit 1 can be practically realized by using, for example, an ROM. In this case, if an input signal and output signal of the non-linear level correction circuit 1 are respectively processed as digital data of 8 bits, the circuit 1 can be practically realized using an ROM having a memory capacity of 2048 bits (256 words×8 bits).

Figure 4:
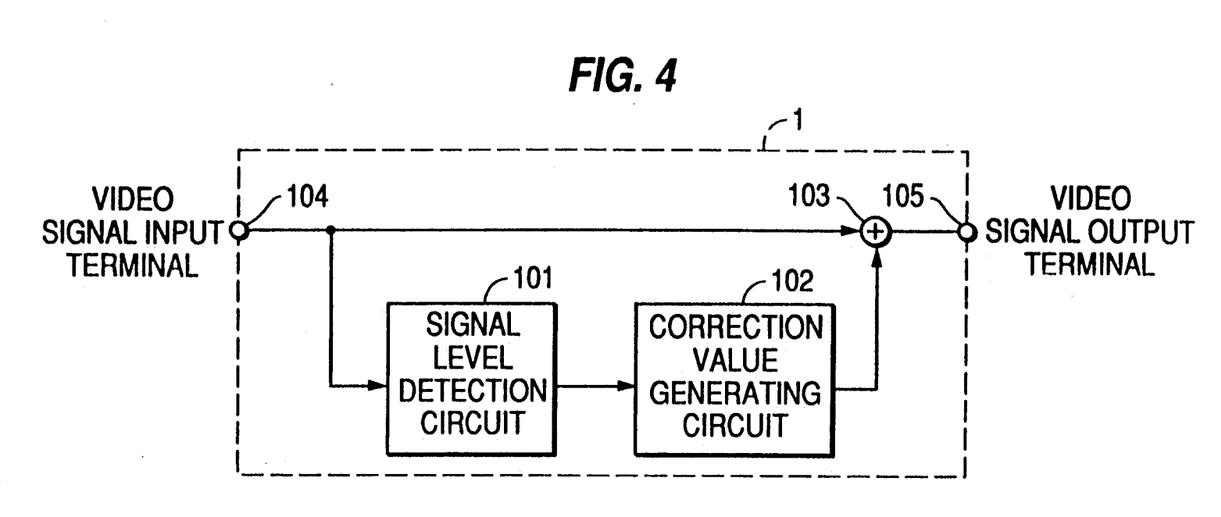
FIG. 4 is a block diagram of a non-linear level correction circuit shown in FIG. 1.

The non-linear level correction circuit 1 may be structured, for example, as shown in FIG. 4, which comprises a signal level detection circuit 101, a correction value generating circuit 102 and an adder 103. In the non-linear level correction circuit 1 shown in FIG. 4, the signal level detection circuit 101 detects a luminance signal level of a MUSE signal inputted from a video signal input terminal 104 and supplies the correction value generating circuit 102 with a control signal in response to the signal level thus detected. The correction value generating circuit 102 supplies a predetermined constant value to one input terminal of the adder 103 as a correction value in response to a control signal supplied from the signal level detection circuit 101. The adder 103 adds the correction value thus inputted to the one input terminal thereof from the correction value generating circuit 102 to a MUSE signal inputted to the other input terminal thereof and sends it to a video signal output terminal 105. For example, if there exists such a relationship as shown Table 1 between the input signal level detected by the signal level detection circuit 101 and the correction value generated by the correction value generating circuit 102, the non-linear level correction circuit 1 operates as explained below. In this case, the input signal level ranges from zero (0) to 255 maximum.

TABLE 1

| Input signal level | Correction value |
| --- | --- |
| 0–3 | 0 |
| 4–10 | 1 |
| 11–18 | 2 |
| 19–29 | 3 |
| 30–44 | 4 |
| 45–67 | 5 |
| 68–138 | 6 |
| 139–171 | 5 |
| 172–194 | 4 |
| 195–214 | 3 |
| 215–232 | 2 |
| 233–248 | 1 |
| 249–255 | 0 |

In case that the signal level detection circuit 101 detects an input signal level ranging from 0 to 3 or from 249 to 255, the correction value generating circuit 102 generates a correction value of zero (0) in response to a control signal from the signal level detection circuit 101 and supplies it to the adder 103. The adder 103 adds the thus generated correction value of 0 to an input signal thereof and outputs the signal thus obtained. Namely, when the signal level of an input signal ranges from 0 to 3 or from 249 to 255, the non-linear level correction circuit 1 sends it directly to the signal converting circuit 2.

Next, in case that the signal level detection circuit 101 detects an input signal level ranging from 4 to 10 or from 233 to 248, the correction value generating circuit 102 generates a correction value of one (1) in response to a control signal from the signal level detection circuit 101 and supplies it to the adder 103. The adder 103 adds the correction value of 1 to an input signal thereof and outputs the signal thus obtained. This means that when the signal level of an input signal ranges from 4 to 10 or from 233 to 248, the non-linear level correction circuit 1 outputs a signal having a signal level added by one thereto to the signal converting circuit 2.

Figure 5:
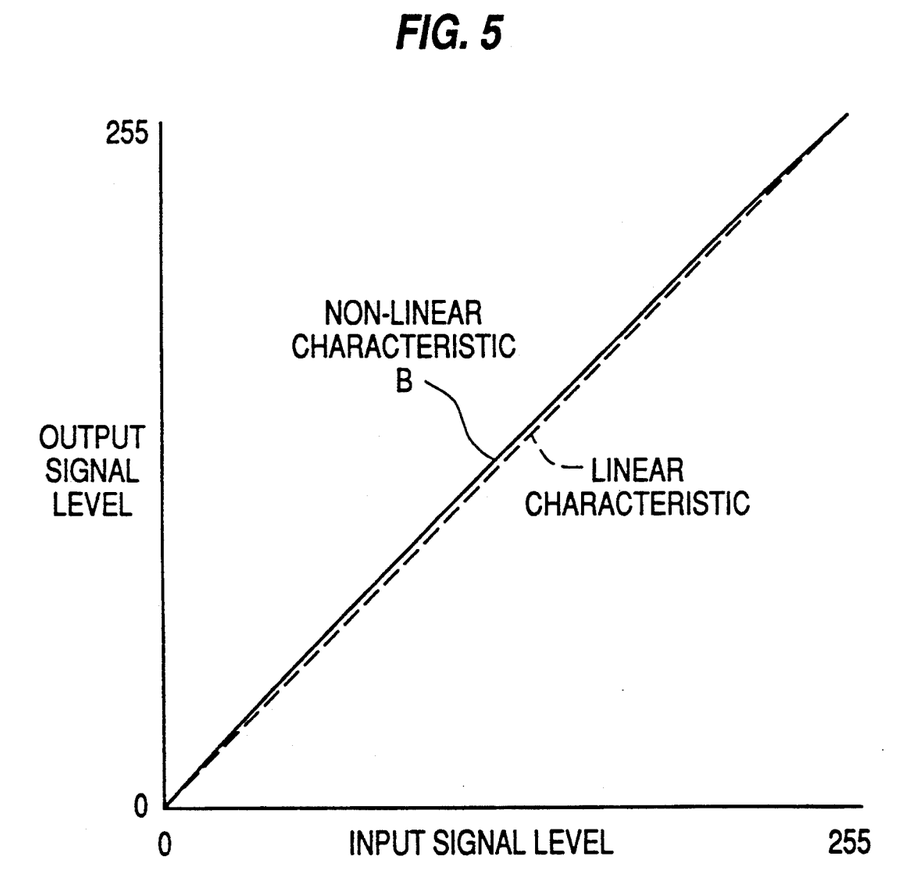
FIG. 5 shows an input-output characteristic of the non-linear level correction circuit shown in FIG. 4.

Similar to the above, the correction value generating circuit 102 supplies the adder 103 with a correction value in response to a signal level of input signal detected by the signal level detection circuit 101. Then, the adder 103 adds the correction value thus obtained to the input signal level and sends it to the next stage. As shown above, the non-linear level correction circuit 1 shown in FIG. 1 converts the signal level of an input signal into a predetermined level in response to the signal level thereof and sends it to the signal converting circuit 2. In this case, the relationship between the input signal level and the output signal level will become a polygonal line B as shown by the continuous line in FIG. 5. This polygonal line B has a characteristic equivalent to that obtained by processing the non-linear level correction for correcting the difference between the non-linear level expansion characteristic to be carried out on the transmission side as shown in FIG. 2 and the characteristic that CRT possesses at an accuracy of 8 bits.

In the non-linear level correction circuit 1 shown in FIG. 4, the signal level detection circuit 101 or the correction value generating circuit 102 is practically realized using an ROM. In this case, an output signal of the ROM will be as shown in Table 1, and can be practically realized with 3 bits of digital data. The memory capacity of an ROM to be used when an input signal to the non-linear level correction circuit 1 is processed with 8 bit digital will become 768 bits (256 words×3 bits). As a result, it makes possible to reduce the memory capacity by approximately 60% compared with when the non-linear level correction circuit 1 is realized using an ROM.

As explained above, by providing the signal level detection circuit 101, the correction value generating circuit 102 and the adder 103, the memory capacity of the ROM to be used for realizing the non-linear characteristic that the non-linear level correction circuit 1 possesses can be decreased, thus realizing a non-linear level correction characteristic using a circuit which is small in scale.

What is claimed is:

1. A television signal converting apparatus for converting a high-definition television signal having a larger number of scanning lines than that of a conventional television signal into the conventional television signal, said high definition television signal having been bandwidth compressed and processed so as to have a non-linear level expansion characteristic at a transmission side and transmitted from the transmission side in the form of a band-compressed television signal, said apparatus comprising:

a non-linear correction means for correcting a signal level of the transmitted band-compressed television signal based on a predetermined non-linear characteristic;

a signal converting means for converting an output signal of said non-linear correction means to the conventional television signal, said signal converting means comprising an interpolation means coupled to said non-linear correction means for interpolating the band-compressed television signal to restore the high-definition television signal, and a scanning line density converting means for changing the number of scanning lines of the high-definition television signal restored by said interpolation means to the number of scanning lines of the conventional television signal;

an inverse matrix means coupled to said signal converting means for producing three primary color signals from an output signal of said scanning line density converting means; and a picture display means coupled to said inverse matrix means for displaying the three primary signals;

wherein said non-linear level correction means corrects for a difference between said non-linear level expansion characteristic and a non-linear electro-optic conversion characteristic of said picture display means.

2. An apparatus according to claim 1, wherein said non-linear level correction means comprises:

a means for producing a predetermined correction value representing a synthesis of said non-linear electro-optic conversion characteristic of said picture display means and an inverse characteristic to said non-linear level expansion characteristic; and a means for adding said predetermined correction value to the transmitted band-compressed television signal.

3. An apparatus according to claim 1, wherein said non-linear level correction means comprises:

a signal level detection means for detecting a level of the transmitted band-compressed television signal;

a means responsive to a detection result of said level detection means for producing a predetermined correction value representing a synthesis of said non-linear electro-optic conversion characteristic of said picture display means and an inverse characteristic to said non-linear level expansion characteristic; and a means for adding said predetermined correction value to the transmitted band-compressed television signal.

4. A television signal converting apparatus for converting a high-definition television signal having a larger number of scanning lines than that of a conventional television signal into the conventional television signal, said high definition television signal having been bandwidth compressed and processed so as to have a non-linear level expansion characteristic at a transmission side and transmitted through a transmission path from the transmission side in the form of a band-compressed television signal, said apparatus comprising:

a non-linear correction means for correcting a signal level of the transmitted band-compressed television signal based on a predetermined non-linear characteristic;

a signal converting means for converting an output signal of said non-linear correction means to the conventional television signal, said signal converting means comprising an interpolation means coupled to said non-linear correction means for interpolating the band-compressed television signal to restore the high-definition television signal, and a scanning line density converting means for changing the number of scanning lines of the high-definition television signal restored by said interpolation means to the number of scanning lines of the conventional television signal;

an inverse matrix means coupled to said signal converting means for producing three primary color signals from an output signal of said scanning line density converting means; and a picture display means coupled to said inverse matrix means for displaying the three primary signals;

wherein said non-linear level correction means corrects a transmission gamma of the transmission path and a gamma of said picture display means at the same time by one predetermined correction value.

5. An apparatus according to claim 4, wherein said non-linear level correction means comprises:

a means for producing a predetermined correction value representing a synthesis of an inverse transmission gamma and the gamma of said picture display means; and a means for adding said predetermined correction value to the transmitted band-compressed television signal.

6. An apparatus according to claim 4, wherein said non-linear level correction means comprises:

a signal level detection means for detecting a level of the transmitted band-compressed television signal;

a means responsive to a detection result by said signal level detection means for producing a predetermined correction value representing a synthesis of a transmission inverse gamma and the gamma of said picture display means; and a means for adding said predetermined correction value to the transmitted band-compressed television signal.

* * * * *